3,433,995
IMAGE CONTRAST CONTROL
Gerald C. Scott, Ann Arbor, Mich., assignor to The Bendix Corporation, a corporation of Delaware
Filed Sept. 2, 1965, Ser. No. 484,597
U.S. Cl. 315—11          2 Claims
Int. Cl. H01j 29/46

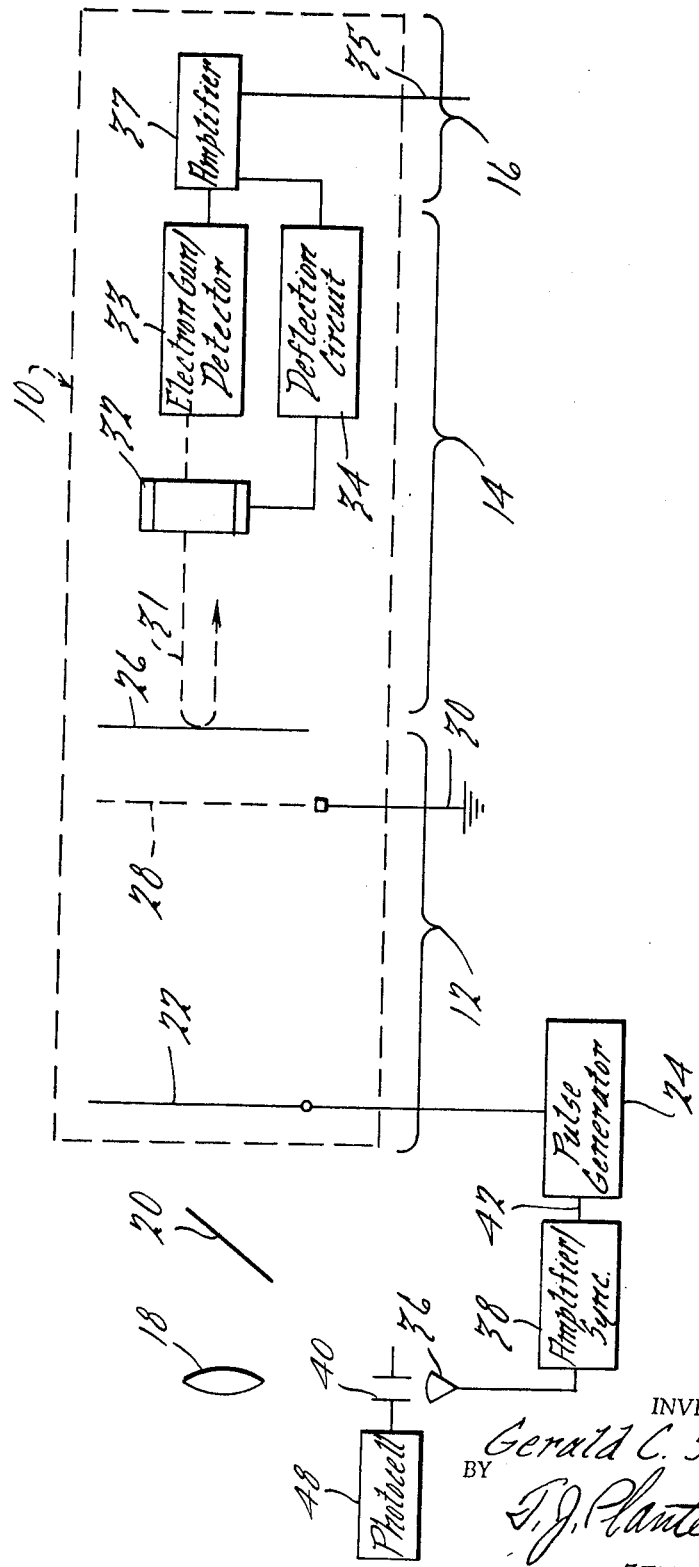

ABSTRACT OF THE DISCLOSURE

An image contrast control for subtracting background radiation from the signal from an object being viewed. Electrons representative of the total incoming signal strike a target from which secondary electrons are emitted. A charge pattern will thus be placed on the target. The portion of that charge pattern produced by the unwanted background radiation is removed by pulsing a beam of electrons equal to the background radiation, but with energy insufficient to cause secondary emission toward that target. The charge remaining on the target will represent the object being viewed and may be read out using well known scan techniques.

---

The present invention relates generally to an image contrast control and more particularly to means for enhancing the contrast between the background and a source of light or electromagnetic radiation.

The usual procedure to observe a star or other light source during daylight has been to attempt to enhance the contrast between the star and its background by controlling the optical aperture stop, adding filters, or varying exposure time. Such techniques, however, affect the light from the star in the same degree as they affect the background radiation and thus do not improve the contrast.

The present invention has as an object to improve contrast by reducing the affect of background emission without substantially affecting the source emission. If contrast is defined by:

$$C = \frac{\text{Highlight} - \text{Lowlight}}{\text{Highlight}} = \frac{(S+B)-B}{S+B} = \frac{S}{S+B}$$

where:

$C$ = contrast
$B$ = the energy contributed by background emission and
$S$ = the energy contributed by source emission then the affect of the present invention may be represented by the following equation:

$$C' = \frac{(S+B-aB)-(B-aB)}{S+B-aB} = \frac{S}{S+B-aB}$$

where:

$C'$ = the enhanced contrast
$aB$ = the amount of supplied energy

In the present invention a detector, such as an image orthicon tube, is used to detect the quantity $S+B$. A light or other source of electromagnetic radiation is pulsed to strike the cathode of the image orthicon at a repetition rate higher than the frame rate of the tube. The intensity of the light or enectromagnetic radiation supplied and the time during which it is emitted determine the quantity $aB$; and by controlling the effective secondary emission of the target of the image orthicon tube, the quantity $Ab$ may be effectively subtracted from the background emission to provide enhanced image contrast $C'$.

It is a further object of the present invention to control the contrast between a source of electromagnetic radiation and background electromagnetic radiation by detecting the sum of such radiation and effectively subtracting all or a portion of the background radiation.

Other objects and advantages of the present invention will become readily apparent from the following detailed description taken in connection with the appended drawings in which:

The drawing is a schematic view of an image contrast control embodying the present invention.

Referring now to the drawing, numeral 10 designates an image orthicon tube detector having image section 12, a scanning section 14 and a control and output section 16. Light or electromagnetic energy from a source 17 is focused by lens 18 through a portion of a half silvered mirror 20 onto the photocathode 22 located in the image section of the orthicon tube 10. The potential of the photocathode 22 is controlled by a potential control device 24 which in normal operation regulates the potential on the cathode to be substantially negative with respect to the target 26 such that the primary electrons emitted from the cathode have sufficient energy when striking the target 26 to cause secondary emission to predominate. A target mesh 28 mounted adjacent target 26 and connected to ground or other reference potential by means of conductor 30 collects a predetermined quantity of secondary electrons to effectively limit the amplitude of the charge on target 26. The charge on the target 26 builds up from a reference value as a function of the time and the quantity of electrons emitted by the cathode (which is a function of the sum of the source and background emission) to a limit imposed by the target mesh. A return type scanning beam 31 in section 14 is controlled by deflecting coil 32 and deflection circuit 34 to scan the target at a predetermined rate over a predetermined pattern. Typically, this pattern comprises a plurality of spaced horizontal lines which are traversed 30 times per second. As a result of secondary emission, areas on the target 26 becomes positively charged or deficient in electrons and then these areas are scanned, electrons are transferred from the scanning beam to make up the deficiency. The control and output section 16 contains a detector 33 and output circuit 37 for detecting the charge on target 26 and generating a signal at output 35 indicative of the position and charge on target 26.

In the normal image orthicon tube such as described above, the output appearing in conductor 35 is the sum of the source and background radiation. If background radiation is or becomes large with respect to the source radiation, contrast is reduced and detection of the source becomes difficult.

In accordance with the present invention, a light source or other source of electromagnetic radiation 36 is pulsed or turned on and off by a control and synchronizing device 38. Radiation from source 36 passes through variable aperture means 40 and is reflected by mirror 20 onto the photocathode 22. Control device 38 is connected to potential control 24 by conductor 42 and is designed to regulate potential control 24 to reduce or equalize the potential difference between cathode and target when source 36 is on. In one example, the photocathode 22 is about 400 volts negative with respect to target 26 during normal operation and about 20 volts negative with respect to the target during the time light source 36 is on. The target mesh 28 is maintained at a potential of about 2 volts positive with respect to target 26. The exposure of photocathode 22 to light source 36 results in the release of an abundance of primary electrons which under the influence of the reduced potential difference between cathode 22 and target 26 migrate toward the target at energy levels insufficient to cause substantial secondary emission from the target and become available to make up electron deficiencies on the target created by prior secondary emission and thus control the effective secondary energy charge on target 26. The quantity of light or radiation supplied by source 36 to cathode 22 may be regulated by varying the aperture 40 and the time duration that the radiation is on may be regulated by control device 38 such that the primary electrons supplied to target 26 approximate the secondary electrons previously emitted due to background radiation. A charge then remains on the target 26 indicative of source radiation which may be detected by the return scanning beam 31 and converted to an output signal of relatively high contrast.

The pulse repetition rate of control device 38 may be selected such that source 36 is turned on and off at a rate higher than the scanning rate of electron beam 31 whereby the background radiation may be effectively subtracted from the total radiation a plurality of times between sweeps of the scanning beam. In a preferred embodiment the source 36 is pulsed about 200 times faster than the sweeping rate of the scanning beam. Various background radiation measuring devices such as a photocell shown diagrammatically at 48 may be used to automatically control the size of aperture 40 and/or the pulse repetition of control device 38 as a function of background radiation.

With the device of the present invention a source otherwise obscured by background radiation may be detected in real time and may be used, for example, in star trackers or navigation systems to provide navigational information during daylight which was otherwise only available at night. The term "background radiation" has been used herein to broadly cover radiation of the same character as the radiation from the source it is desired to detect without regard to the location of the "background radiation" with respect to the source.

Although the present invention has been described with reference to a preferred embodiment, it will be readily apparent to those skilled in the art that various changes and modifications may be made without departing from the spirit of the invention.

I claim:
1. A contrast control for an imaging device having a transducer for converting electromagnetic radiation to primary electron discharge, and a target for receiving said primary electrons to form an electrostatic image thereon, of electromagnetic radiation comprising: control means energizable to reduce effective secondary emission from said target, means synchronized with said control means for exposing said transducer to said source of electromagnetic radiation for a controlled time duration to cause a controlled quantity of primary electrons to be emitted by said transducer, and scanning beam means for scanning said target and generating an output indicative of the charge on said target.

2. In an image orthicon tube having a source of electromagnetic radiation, cathode means for converting electromagnetic radiation to primary electron discharge, target means for receiving said primary electrons to form an electrostatic image, target mesh and means for limiting the amplitude of the charge on said target means, the improvement comprising potential control means for periodically reducing the potential between said cathode means and said target means, means synchronized with said potential control means for exposing said cathode means to said source of electromagnetic radiation for a controlled time duration to cause a controlled quantity of primary electrons to be emitted, and means for scanning said target and generating an output indicative of the charge on said target.

References Cited

UNITED STATES PATENTS 2,875,371  2/1959  Perkins _____ 315—11

RODNEY D. BENNETT, *Primary Examiner.*

C. E. WANDS, *Assistant Examiner.*

U.S. Cl. X.R.

315—12

UNITED STATES PATENT OFFICE
CERTIFICATE OF CORRECTION

Patent No. 3,433,995

March 18, 1969

Gerald C. Scott

It is certified that error appears in the above identified patent and that said Letters Patent are hereby corrected as shown below:

In the sheet of drawings, lens 18 and half-silvered mirror 20 are incorrectly positioned. Mirror 20 should be placed dire above aperture 40 and lens 18 should be placed to the left of mirror 20. In addition, a source of light 17 should appear to left of lens 18. Column 1, line 64, "enectromagnetic" should r -- electromagnetic --. Column 2, line 39, "then" should read -- when --. Column 3, line 39, "readly" should read -- readily -- Column 4, line 19, "target mesh and" should read -- and target mesh --.

Signed and sealed this 7th day of April 1970.

(SEAL)
Attest:

Edward M. Fletcher, Jr.

Attesting Officer

WILLIAM E. SCHUYLER, JR.

Commissioner of Patents